United States Patent
Wolford

(10) Patent No.: US 12,314,117 B2
(45) Date of Patent: May 27, 2025

(54) ADJUSTING POWER CAPS FOR COMPUTING SYSTEM COMPONENTS

(71) Applicant: LENOVO ENTERPRISE SOLUTIONS (SINGAPORE) PTE LTD., Singapore (SG)

(72) Inventor: Robert R. Wolford, Strongsville, OH (US)

(73) Assignee: LENOVO ENTERPRISE SOLUTIONS (SINGAPORE) PTE. LTD, Singapore (SG)

( * ) Notice: Subject to any disclaimer, the term of this patent is extended or adjusted under 35 U.S.C. 154(b) by 97 days.

(21) Appl. No.: 18/193,773

(22) Filed: Mar. 31, 2023

(65) Prior Publication Data
US 2024/0329723 A1 Oct. 3, 2024

(51) Int. Cl.
*G06F 1/32* (2019.01)
*G06F 1/3296* (2019.01)
(52) U.S. Cl.
CPC ................... *G06F 1/3296* (2013.01)
(58) Field of Classification Search
None
See application file for complete search history.

(56) References Cited

U.S. PATENT DOCUMENTS

| | | | |
|---|---|---|---|
| 9,874,917 B2 | 1/2018 | Lefurgy et al. | |
| 2009/0177907 A1* | 7/2009 | Sotomayor, Jr. | G06F 1/3203 713/340 |
| 2012/0017104 A1* | 1/2012 | Siba | G06F 1/3203 713/323 |
| 2013/0318376 A1* | 11/2013 | Sawai | G06F 1/3296 713/320 |
| 2015/0012764 A1* | 1/2015 | Carlson | G06F 1/32 713/320 |
| 2018/0081413 A1* | 3/2018 | Lefurgy | G06F 1/3296 |
| 2020/0033926 A1* | 1/2020 | Maddukuri | G06F 1/28 |

OTHER PUBLICATIONS

Allen et al., Performance Optimization in Power Capped GPU Computing, Clemson University, URL: http://sc20.supercomputing.org/proceedings/src_poster/poster_files/spostg111s2-file2.pdf, retrieved from cite Nov. 23, 2022, 2 pages.

* cited by examiner

*Primary Examiner* — Nitin C Patel

(57) ABSTRACT

Systems and apparatus for adjusting power caps for computing system components includes: a power subsystem, one or more components, and a BMC (baseboard management controller) configured to: receive, from the power subsystem, an over-power signal indicating a draw on the power subsystem exceeding one or more limits of the power subsystem, and reduce, by a predetermined amount, a power cap for the one or more components.

17 Claims, 4 Drawing Sheets

ADJUSTING POWER CAPS FOR COMPUTING SYSTEM COMPONENTS

BACKGROUND

Field of the Disclosure

The field of the disclosure is data processing, or, more specifically, methods, apparatus, and systems for adjusting power caps for computing system components.

Description of Related Art

In a computing system, when the sum of all the power from all the components of the system exceeds the capacity of the power subsystem, the computing system may shut down unexpectedly. Existing solutions to this problem include aggressively throttling computing components in response to a power excursion, where the power draw from the system moves from slightly above the power limit of the power subsystem to drastically below the power limit. Some components in a computing system draw more power than others. Managing the power draw on the computing components which normally draw the most power could prevent the system from overdrawing power from the power subsystem.

SUMMARY

Methods, systems, and products for adjusting power caps for computing system components according to various embodiments are disclosed in this specification. In accordance with one aspect of the present disclosure, a method of adjusting power caps for computing system components may include receiving, from a power subsystem of a computing system, an over-power signal indicating a draw on the power subsystem exceeding one or more limits of the power subsystem, and reducing, by a predetermined amount, a power cap for one or more components of the computing system.

In accordance with another aspect of the present disclosure, adjusting power caps for computing system components may include a system including: a power subsystem, one or more components, and a BMC (baseboard management controller) configured to: receive, from the power subsystem, an over-power signal indicating a draw on the power subsystem exceeding one or more limits of the power subsystem, and reduce, by a predetermined amount, a power cap for the one or more components.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
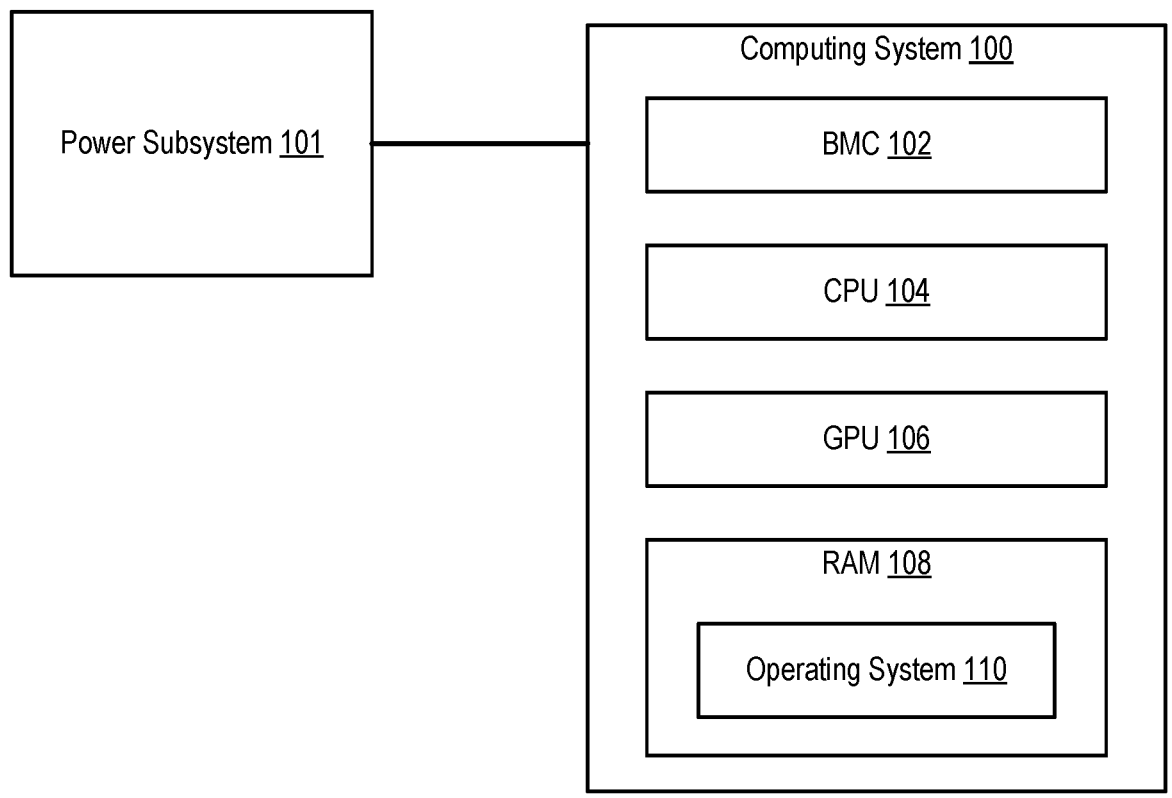
FIG. 1 shows an example block drawing of a system configured for adjusting power caps for computing system components in accordance with embodiments of the present disclosure.

Exemplary methods, systems, and products for adjusting power caps for computing system components in accordance with the present disclosure are described with reference to the accompanying drawings, beginning with FIG. 1. FIG. 1 sets forth a block drawing of an example system configured for adjusting power caps for computing system components in accordance with embodiments of the present disclosure. A power cap as the term is used here refers to an upper limit of power that is allowed to be drawn by a component of a computing system. The example system of FIG. 1 includes a power subsystem 101 and a computing system 100 including multiple components.

The example power subsystem 101 of FIG. 1 is configured to deliver power to the computing system 100. The power subsystem 101 may include any combination of a power supply unit (PSU), a subsystem of a PSU, or some other power subsystem, such as power components, fuses, and the like. In the example system of FIG. 1, the power subsystem 101 is positioned exterior to the computing system 100. In another embodiment, not shown in FIG. 1, the power subsystem 101 may be included within the computing system 100. The power subsystem 101 is configured to deliver power to each of the components included within the computing system 100. The power subsystem 101 may be configured to send, to the computing system 100, an 'OVER_POWER signal' when the power subsystem is stressed beyond the power subsystem's power or current limit. The OVER_POWER signal is a warning to the computing system 100 indicating the presence of a draw on the power subsystem exceeding one or more limits of the power subsystem. In some embodiments, the computing system 100 may only have a small amount of time to respond or react to the OVER_POWER signal before the power subsystem shuts down or uses up all of the power subsystem's power reserves, such as capacitor banks or the like.

The example computing system 100 of FIG. 1 includes multiple components, such as a BMC (baseboard management controller) 102, CPU (central processing unit) 104, GPU (graphics processing unit), and RAM (random access memory) 108. Stored in RAM 108 is an operating system 110. Operating systems useful in computers configured for adjusting power caps for computing system components according to embodiments of the present disclosure include UNIX™, Linux™, Microsoft Windows™, AIX™, and others as will occur to those of skill in the art. The operating system 110 in the example of FIG. 1 is shown in RAM 108, but many components of such software typically are stored in non-volatile memory also (not shown in FIG. 1). In the example system of FIG. 1, the BMC 102 is included as a component of the computing system 100. In another embodiment, not shown in FIG. 1, the BMC 102 may be a component separate from the computing system 100. In the example computing system 100 of FIG. 1, the BMC 102 includes firmware and memory and is configured to monitor and manage various components of the computing system 100. The BMC 102 may be configured to receive OVER_POWER signals from the power subsystem 101.

In the example computing system 100 of FIG. 1, some components of the system draw significantly more power than other components of the system. For example, CPU 104 and GPU 106 may draw more power than RAM 108. Such high power components draw the highest percentage of the computing system's power. Those of skill in the art will recognize that having the ability to set a power cap on the system's high power components provides an effective method of controlling the total power draw on the power subsystem. The BMC 102 may be configured to set a power cap on one or more components of the computing system in response to receiving an OVER_POWER signal from the power subsystem indicating a draw on the power subsystem exceeding one or more limits of the power subsystem. The BMC 102 may be configured to adjust the set power cap in response to receiving subsequent OVER_POWER signals, where the power cap is reduced each time an OVER_POWER signal is received, in order to prevent future OVER_POWER signals from being received. That is, the BMC 102 may be configured to adaptively set and adjust power caps for individual components of the computing system to reduce the likelihood, and eventually prevent, the power subsystem from experiencing over-power events that cause the power subsystem to send OVER_POWER signals. In one embodiment, the power caps set on the one or more components may be adjusted linearly, where the power cap is reduced a predetermined amount each time an OVER_POWER signal is received. In another embodiment, the power caps set on the one or more components may be adjusted dynamically, where the amount the power cap is adjusted is based on a rate of received OVER_POWER signals.

Figure 2:
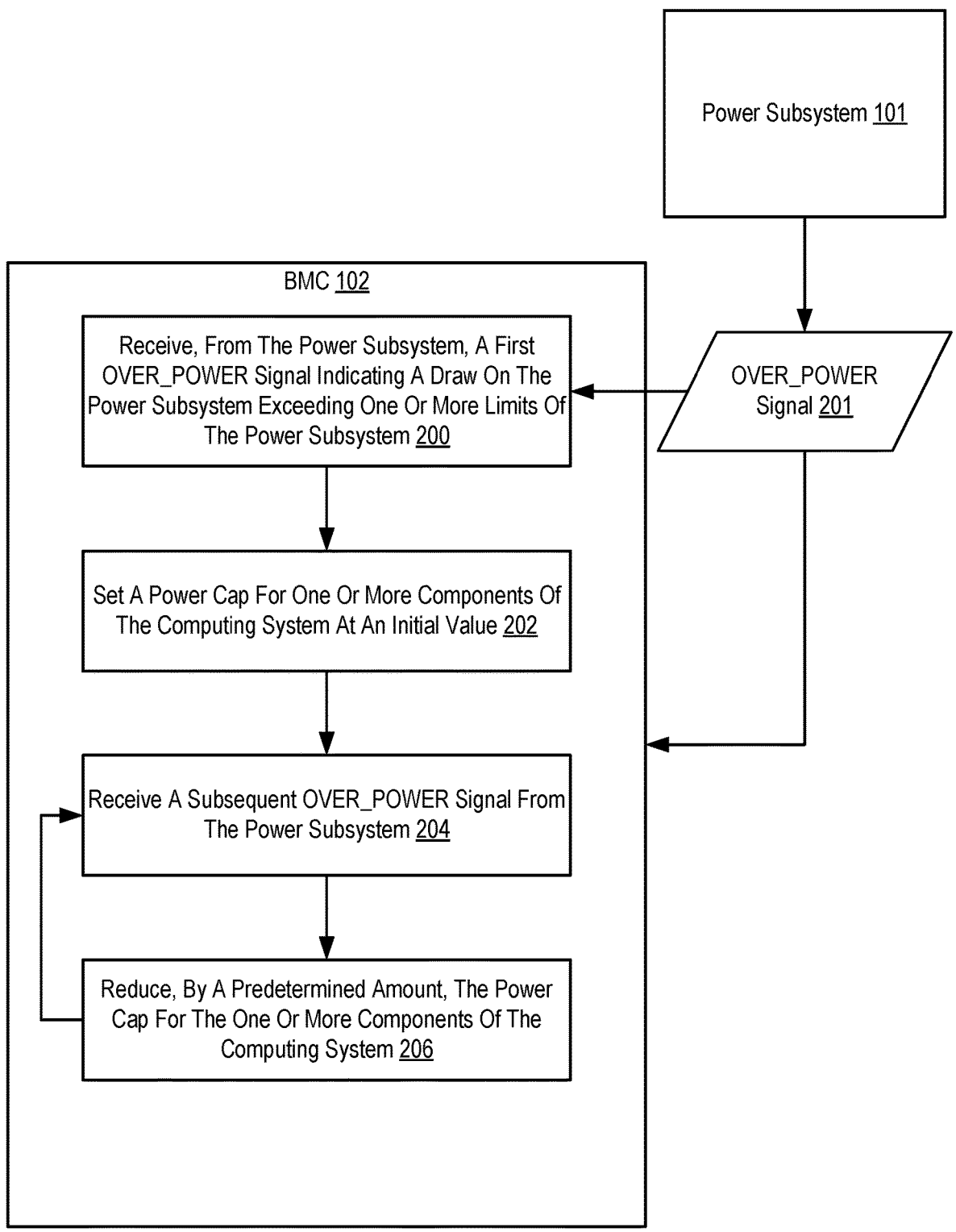
FIG. 2 is a flowchart of an example method for adjusting power caps for computing system components according to some embodiments of the present disclosure.

For further explanation, FIG. 2 sets forth a flow chart illustrating an exemplary method of adjusting power caps for computing system components according to embodiments of the present disclosure. The method of FIG. 2 includes receiving 200, from a power subsystem of a computing system, a first OVER_POWER signal indicating a draw on the power subsystem exceeding one or more limits of the power subsystem. Receiving 200 a first OVER_POWER signal may be carried out by the BMC 102 receiving the OVER_POWER signal 201 from the power subsystem 101 over an out-of-band power subsystem network, a management network, or the like. The one or more limits of the power subsystem may be a current limit or a power limit, set by the power subsystem or set by an administrator for the power subsystem. The OVER_POWER signal 201 indicates a draw on the power subsystem exceeding one or more limits of the power subsystem 101. For example, the OVER_POWER signal may be a PSU THROTTLE #signal, an electronic fuse over-current warning or error, a PSU over-power warning or error, and the like.

The method of FIG. 2 also includes setting 202, for one or more components of the computing system, a power cap to an initial value upon receiving a first OVER_POWER signal from the power subsystem. Setting 202 a power cap to an initial value may be carried out by the BMC 102 in response to receiving a first OVER_POWER signal 201 from the power subsystem 101. That is, when the BMC receives an OVER_POWER signal from the power subsystem, the BMC may set a power cap for one or more components at an initial value in response to determining that a power cap has not been set for the one or more components. The one or more components may be the CPU 104, the GPU 106, or other high power components within the computing system not shown in FIG. 1.

In the example computing system 100, the BMC 102 may set a power cap for a component that limits the draw of power by that component. For example, the BMC may set a power cap relative to the natural power limit (such as the TDP or 'thermal design power') of a component. In another embodiment, a power cap may be set for the one or more components by setting a maximum allowed P-state not to be exceeded, thereby limiting the power drawn by the component. Setting a power cap for one or more high-power components of the computing system allows for control of the overall power drawn by the computing system, where adjusting the power caps can prevent the computing system from placing a draw on the power subsystem that exceeds one or more limits of the power subsystem. The power cap may be set at an initial value that is some predetermined percentage lower than the natural power limit (or TDP) of that component. The initial value may, in some embodiments, be programmable or selectable by an administrator.

The method of FIG. 2 also includes receiving 204 a subsequent OVER_POWER signal from the power subsystem. Receiving 204 a subsequent OVER_POWER signal may be carried out by the BMC 102 receiving another OVER_POWER signal 201 from the power subsystem over a network. The subsequent OVER_POWER signal may be similar to the first OVER_POWER signal received from the power subsystem, indicating a draw on the power subsystem exceeding one or more limits of the power subsystem. For example, the power subsystem, even after the power cap is set on one or more components of the computing system, may continue to experience over-power events causing the power subsystem to send subsequent OVER_POWER signals to the computing system.

The method of FIG. 2 also includes reducing 206, by a predetermined amount, the power cap for the one or more components of the computing system. Reducing 206 the power cap for the one or more components of the computing system may be carried out by the BMC 102 lowering the power cap by a predetermined percentage or value in response to receiving the subsequent OVER_POWER signal. Lowering the power cap reduces the power draw by the one or more components and reduces the likelihood of exceeding the one or more power limits of the power subsystem. The BMC may continue to reduce the power cap each time an OVER_POWER signal is received from the power subsystem, to eventually prevent the power subsystem from sending OVER_POWER signals to the computing system.

Figure 3:
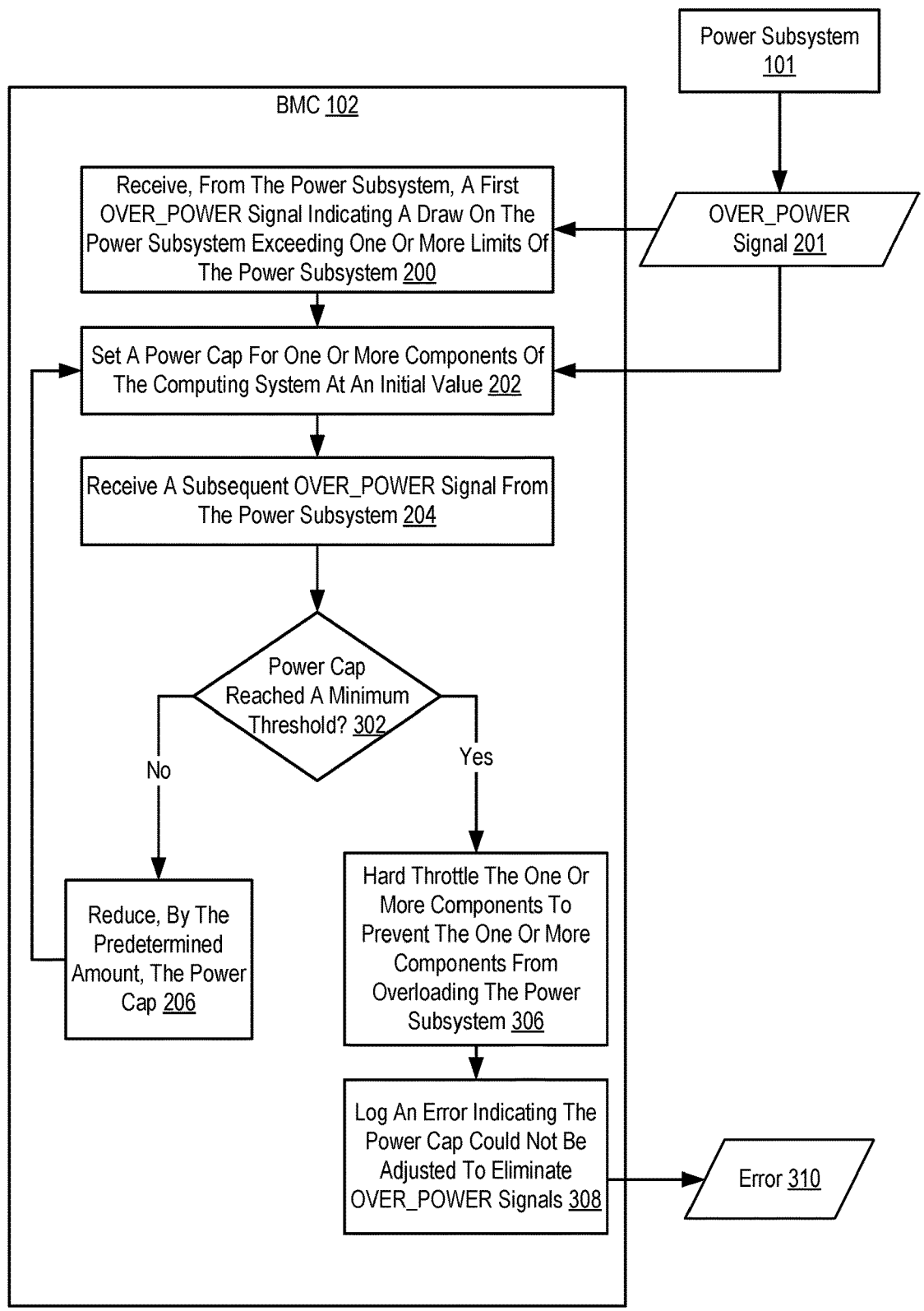
FIG. 3 is a flowchart of an example method for adjusting power caps for computing system components according to some embodiments of the present disclosure.

For further explanation, FIG. 3 sets forth a flowchart illustrating an example method of adjusting power caps for computing system components according to embodiments of the present disclosure. The method of FIG. 3 sets forth a variation of the method of FIG. 2. In the method of FIG. 3, upon receiving 204 the subsequent OVER_POWER signal from the power subsystem, the BMC 102 determines 302 whether the power cap has reached a minimum threshold. Determining 302 whether the power cap has reached a minimum threshold may be carried out by the BMC 102 comparing the value of the power cap with the minimum threshold. The minimum threshold may be set, by a user, to a value that severely limits the component. The minimum threshold may also be adjustable by a user.

If the power cap has not reached the minimum threshold, then the method of FIG. 3 continues by again reducing 206 the power cap for the one or more components by the predetermined amount. When the power cap has reached a minimum, the method of FIG. 3 continues by hard throttling 306 the one or more components to prevent the one more components from overloading the power subsystem. Hard throttling 306 the one or more components may be carried out by the BMC 102 using a hard throttling mechanism, such as CPU PROCHOT, GPU PWRBRK #, or the like, in response to determining that the power cap has reached the minimum threshold. For example, upon determining that the power cap has reached the minimum threshold, which may indicate that the performance of the one or more components has been severely limited, the BMC may, rather than again reducing the power cap, instead employ a hard throttling mechanism on the one or more components, in order to prevent the one more components from overloading the power subsystem.

The method of FIG. 3 also includes logging 308 an error indicating the power cap could not be adjusted to eliminate OVER_POWER signals. Logging 308 an error 310 may be carried out by the BMC 102 storing, in memory, an error that indicates the power cap could not be adjusted to a value that prevented OVER_POWER signals from being received from the power subsystem. The error 310 may be stored in memory external to the BMC or internal to the BMC. In one embodiment, the error 310 may be sent to an administrator or other user. The error 310 may be logged in response to hard throttling the one or more components or in response to determining that the power cap has reached the minimum threshold. In the example method of FIG. 3, upon determining the power cap has reached the minimum threshold, the BMC 102 hard throttles the one or more components and logs an error indicating, to a user viewing the error, that the power cap could not be adjusted to a point that could prevent the power subsystem from experiencing over-power events that cause the power subsystem to send OVER_POWER signals. In one embodiment, a user may reset the power cap. Resetting a power cap may include resetting the value of the power cap to its first initial value. In another embodiment, resetting the power cap may include removing the power cap entirely, allowing a new power cap to be set in the future.

Figure 4:
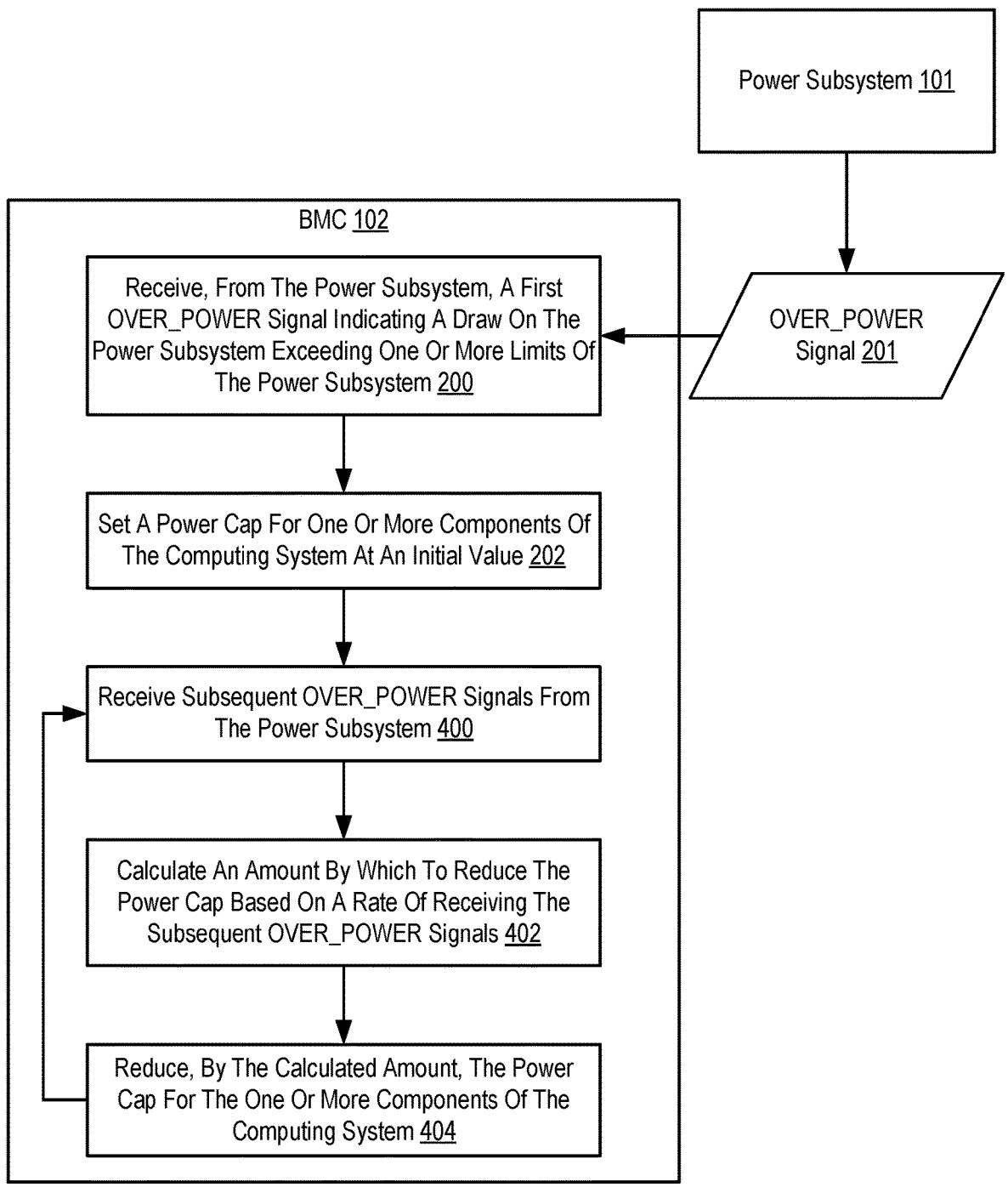
FIG. 4 is a flowchart of an example method for adjusting power caps for computing system components according to some embodiments of the present disclosure.

For further explanation, FIG. 4 sets forth a flowchart illustrating another example method of adjusting power caps for computing system components according to embodiments of the present disclosure. The method of FIG. 4 continues with the method of FIG. 2 by further including receiving 400 a plurality of subsequent OVER_POWER signals from the power subsystem. Receiving 400 subsequent OVER_POWER signals from the power subsystem may be carried out by the BMC 102 receiving multiple other OVER_POWER signals from the power subsystem 101 over a network. Each of the multiple OVER_POWER signals may be similar to OVER_POWER signal 201. The subsequent OVER_POWER signals may be received at the same time or may be received one at a time over a duration of time.

The method of FIG. 4 also includes calculating 402 an amount by which to reduce the power cap based on a rate of receiving the subsequent OVER_POWER signals. Calculating 402 an amount by which to reduce the power cap may be carried out by the BMC 102 in response to receiving the subsequent OVER_POWER signals. Calculating 402 an amount by which to reduce the power cap may include calculating the rate of receiving the subsequent OVER_POWER signals. Calculating the rate of receiving the subsequent OVER_POWER signals may include waiting a predetermined amount of time and counting the number of OVER_POWER signals received during the predetermined amount of time. The waiting of the predetermined amount of time may be triggered based on receiving the first of the OVER_POWER signals from the power subsystem. The predetermined amount of time may be selected by a user and may later be user adjustable. After determining the rate of receiving the subsequent OVER_POWER signals, the BMC 102 may calculate the amount by which to reduce the power cap based on the rate, where the amount the power cap is reduced increases as the rate increases. The amount by which to reduce the power cap based on the rate may be set by a user. The method of FIG. 4 differs from the method of FIG. 2 in that, rather than reducing the power cap a predetermined amount each time an OVER_POWER signal is received, as in the method of FIG. 2, the method of FIG. 4 instead waits a certain amount of time to calculate how often OVER_POWER signals are received, and then calculates the amount by which to reduce the power cap based on that calculated rate of receiving OVER_POWER signals. In calculating the amount reduce the power cap based on the rate of received OVER_POWER signals, the BMC may more accurately calculate the value at which the power cap should be set. Such a method may be utilized when the computing system is executing transient workloads that cause the power subsystem to experience many over-power events in a small amount of time, allowing the BMC to more effectively adjust the power cap to a value that will prevent the power subsystem from experiencing over-power events.

The method of FIG. 4 also includes reducing 404, by the calculated amount, the power cap for the one or more components of the computing system. Reducing 404 the power cap may be carried out by the BMC 102 lowering the power cap by the calculated amount based on the rate of receiving the subsequent OVER_POWER signals. The calculated amount may be a determined percentage by which to lower the power cap. Lowering the power cap reduces the power draw by the one or more components and reduces the likelihood of exceeding the one or more power limits of the power subsystem. In reducing the power cap by the calculated amount, rather than reducing the power cap a predetermined amount each time an OVER_POWER signal is received, as in the method of FIG. 2, the method of FIG. 4 may reduce the adjustment rate of the power cap in instances where the power subsystem experiences multiple over-power events over a small amount of time. For example, the number of received OVER_POWER signals (which may each correspond to an over-power event experienced by the power subsystem) within a given time period are counted, and then the power cap is reduced by an amount that is proportional to the number of received OVER_POWER signals that have been counted within the time period. In such an example, there can be less thrashing of the adaptive power cap because, instead of being adjusted in small increments on every occurrence of an OVER_POWER signal, the power cap is adjusted in larger increments, but adjusted less often. The method of FIG. 4 may be combined with the method of FIG. 2 or FIG. 3 at any point after the power cap has been set. For example, the receiving 400, calculating 402, and reducing 404 may occur one or more times during the method of FIG. 2 or FIG. 3. A user may select to switch back and forth between the method of FIG. 3 and the method of FIG. 4.

In view of the explanations set forth above, readers will recognize that the benefits of adjusting power caps for computing system components according to embodiments of the present disclosure include:

Reducing the number of times a power subsystem experiences over-power events, thereby increasing power subsystem performance.

Increasing system reliability and preventing system shutdown from occurring prematurely due to unplanned over-power events experienced by the power subsystem, which may cause the computing system to shut down.

The flowchart and block diagrams in the Figures illustrate the architecture, functionality, and operation of possible implementations of systems, methods, and apparatus according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments of the present disclosure are described largely in the context of a fully functional computer system for dynamic buffer selection in ethernet controllers. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   receiving, from a power subsystem of a computing system, an over-power signal indicating that a draw on the power subsystem exceeds one or more limits of the power subsystem; and
   based on the received over-power signal and a determination that a power cap for one or more components of the computing system is at or below a minimum threshold, hard throttling the one or more components to prevent the one or more components from overloading the power subsystem.

2. The method of claim 1, further comprising:
   receiving one or more subsequent over-power signals;
   calculating an amount by which to further reduce the power cap based on a rate of receiving the one or more subsequent over-power signals; and
   again reducing, by the calculated amount, the power cap for the one or more components of the computing system.

3. The method of claim 1, further comprising:
   receiving a subsequent over-power signal; and
   based on the received subsequent over-power signal, again reducing, by the predetermined amount, the power cap for the one or more components of the computing system.

4. The method of claim 1, further comprising:
   logging an error indicating the power cap could not be adjusted to eliminate over-power signals.

5. The method of claim 1, wherein the over-power signal is a second over-power signal, the method further comprising:
   setting the power cap to an initial value upon receiving a first over-power signal from the power subsystem, wherein the first over-power signal is received prior to the second over-power signal.

6. The method of claim 5, further comprising determining the initial value based on a component's TDP (Thermal Design Power) limit.

7. A system comprising:
   a power subsystem;
   one or more components; and
   a BMC (baseboard management controller) configured to:
      receive, from the power subsystem, an over-power signal indicating that a draw on the power subsystem exceeds one or more limits of the power subsystem; and
      based on the received over-power signal and a determination that a power cap for the one or more components is at or below a minimum threshold, hard throttling the one or more components to prevent the one or more components from overloading the power subsystem.

8. The system of claim 7, wherein the BMC is further configured to:
   receive one or more subsequent over-power signals;
   calculate an amount by which to further reduce the power cap based on a rate of receiving the one or more subsequent over-power signals; and
   again reduce, by the calculated amount, the power cap for the one or more components.

9. The system of claim 7, wherein the BMC is further configured to:
   receive a subsequent over-power signal; and
   based on the received subsequent power-over signal, again reduce, by the predetermined amount, the power cap for the one or more components.

10. The system of claim 7, wherein the BMC is further configured to log an error indicating the power cap could not be adjusted to eliminate over-power signals.

11. The system of claim 7, wherein the over-power signal is a second over-power signal, wherein the BMC is further configured to set the power cap to an initial value upon receiving a first over-power signal from the power subsystem, wherein the first over-power signal is received prior to the second over-power signal.

12. The system of claim 11, wherein the BMC is further configured to determine the initial value based on a component's TDP (Thermal Design Power) limit.

13. A computer program product comprising a non-volatile computer readable storage medium and computer program instructions stored therein that are configured to, when executed by a processor, cause a computer to perform operations comprising:

receiving, from a power subsystem of a computing system, an over-power signal indicating that a draw on the power subsystem exceeds one or more limits of the power subsystem; and based on the received over-power signal and a determination that a power cap for one or more components of the computing system is at or below a minimum threshold, hard throttling the one or more components to prevent the one or more components from overloading the power subsystem.

14. The computer program product of claim 13, further comprising:

receiving one or more subsequent over-power signals;

calculating an amount by which to further reduce the power cap based on a rate of receiving the one or more subsequent over-power signals; and again reducing, by the calculated amount, the power cap for the one or more components of the computing system.

15. The computer program product of claim 13, further comprising:

receiving a subsequent over-power signal; and based on the received subsequent power-over signal, again reducing, by the predetermined amount, the power cap for the one or more components of the computing system.

16. The computer program product of claim 13, further comprising:

logging an error indicating the power cap could not be adjusted to eliminate over-power signals.

17. The computer program product of claim 13, wherein the over-power signal is a second over-power signal, further comprising:

setting the power cap to an initial value upon receiving a first over-power signal from the power subsystem, wherein the first over-power signal is received prior to the second over-power signal.

* * * * *